US011822860B2

United States Patent
Wilkins et al.

(10) Patent No.: US 11,822,860 B2
(45) Date of Patent: Nov. 21, 2023

(54) PRODUCT CONFIGURATOR WITH AUTOMATED RULE LEARNING

(71) Applicant: Oracle International Corporation, Redwood Shores, CA (US)

(72) Inventors: Jeffrey Wilkins, Palatine, IL (US); Re Lai, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1091 days.

(21) Appl. No.: 15/923,373

(22) Filed: Mar. 16, 2018

(65) Prior Publication Data

US 2019/0286759 A1 Sep. 19, 2019

(51) Int. Cl.
*G06F 30/00* (2020.01)
*G06N 3/08* (2023.01)
*G06N 3/042* (2023.01)

(52) U.S. Cl.
CPC ............. *G06F 30/00* (2020.01); *G06N 3/042* (2023.01); *G06N 3/08* (2013.01)

(58) Field of Classification Search
CPC ........ G06N 20/00; G06N 3/08; G06N 3/0454; G06N 5/04; G06N 3/088; G06N 5/022; G06N 7/005; G06N 3/02; G06N 3/04; G06N 3/0445; G06N 3/0472; G06N 3/063; G06N 3/084; G06N 5/02; G06N 5/025; G06N 5/048; G06N 7/02; G06N 5/046; G06N 3/006; G06N 3/126; G06N 20/20; G06N 3/082
See application file for complete search history.

(56) References Cited

U.S. PATENT DOCUMENTS

2008/0301081 A1* 12/2008 Karnik ................ G06F 9/44505 706/48

OTHER PUBLICATIONS

Hsiao et al., A neural network based approach for product form design, 2002, Design Studies vol. 23 No. 1 Jan. 2002, pp. 67-84 (Year: 2002).*
Biagini et al., Preliminary Design Through Graphs: A Tool for Automatic Layout Distribution, 2015, International Journal of Architecture and Planning, vol. 2, Issue 2, pp. 1-13 (Year: 2015).*

(Continued)

*Primary Examiner* — Ann J Lo
*Assistant Examiner* — Charles C Kuo
(74) *Attorney, Agent, or Firm* — Potomac Law Group, PLLC

(57) ABSTRACT

A product configuration device outputs a configuration of a product in accordance with a set of configuration rules. The product configuration device includes a rule learning system configured to acquire a first set of data representing a plurality of configurations of the product; to generate a neural network model representing the first set of data; to extract relationships between configuration attributes from the neural network model; and to modify the set of configuration rules based on the extracted relationships to generate a modified set of configuration rules for the product configuration device. The product configuration device may also include a rule execution engine that outputs the configuration of the product based on the modified set of configuration rules.

20 Claims, 9 Drawing Sheets

(56) References Cited

OTHER PUBLICATIONS

Chen, Zhaoxun et al., Adaptable Product Configuration System Based on Neural Network, Sep. 15, 2009, International Journal of Production Research, vol. 47, No. 18, pp. 5037-5066 (Year: 2009).*
Kabir et al., A New Wrapper Feature Selection Approach Using Neural Network, 2010, Neurocomputing 73 pp. 3273-3283 (Year: 2010).*
Hsiao et al., Applying a Hybrid Approach Based on Fuzzy Neural Network and Genetic Algorithm to Product Form Design, 2004 (Year: 2004).*
Shen et al. (Personalized Configuration Rules Extraction in Product Service Systems by using Local Cluster Neural Network, 2015 (Year: 2015).*
Chris McCormick, "Word2Vec Tutorial—The Skip-Gram Model", Apr. 19, 2016, Retrieved from http://www.mccormickml.com on Mar. 14, 2018.
Tomas Mikolov et al., "Distributed Representations of Words and Phrases and their Compositionality", arXiv:1310.4546 [cs.CL], Oct. 16, 2013, pp. 1-9.

* cited by examiner

| row | a | b | c | d | e | f | g |
|---|---|---|---|---|---|---|---|
| 1 | [A] | [D] | V | Y | M | T | P |
| 2 | [A] | F | [V] | R | S | W | P |
| 3 | [A] | D | V | [R] | N | Q | P |
| 4 | [O] | F | V | R | [C] | Q | J |
| 5 | [O] | D | V | H | U | [T] | J |
| 6 | [O] | I | V | H | S | T | [J] |
| 7 | [G] | [F] | V | R | E | L | K |
| 8 | [G] | I | [V] | R | M | T | K |
| 9 | [G] | F | V | [Y] | E | L | K |
| 10 | [A] | F | V | Y | [U] | W | P |

Fig. 8B

| a | b | c | d | e | f | g |
|---|---|---|---|---|---|---|
| A | D | V | Y | M | T | P |
| A | F | V | R | S | W | P |
| A | D | V | R | N | Q | P |
| O | F | V | R | C | Q | J |
| O | D | V | H | U | T | J |
| O | I | V | H | S | T | J |
| G | F | V | R | E | L | K |
| G | I | V | R | M | T | K |
| G | F | V | Y | E | L | K |
| A | F | V | Y | U | W | P |

Fig. 8A

PRODUCT CONFIGURATOR WITH AUTOMATED RULE LEARNING

FIELD

One embodiment is directed generally to a computer system, and in particular a computer system that uses rules for configuring products.

BACKGROUND INFORMATION

Many products such as construction equipment, manufacturing equipment, transportation equipment, production lines, and computers, among others, can be customized to very specific requirements and user preferences. Such customization, also referred to as "configuration," is complex due to the many possible combinations of features and configuration settings of these types of products.

Product and service providers will often provide a tool for configuring these types of products. This tool is referred to as a "product configurator." The product configurator may be used by sales staff or the end customer. The product configurator may be implemented as a computer system that is itself programmed with rules and configuration options, and then applies the rules to the configuration options to output a configuration that complies with the rules.

The rules executed by product configurators may specify valid and invalid combinations of configuration attributes. Within the valid combinations, there may be additional combinations of attributes that are desirable for customers and may improve the usability of the end configured product for a particular type of a customer; or may be more lucrative to manufacture and sell for the provider.

While the customer may have the ability to manually override the configuration provided by the product configurator, it is undesirable and burdensome to require the customer to change the proposed configuration. In some situations there may be simply too many configuration options which may overwhelm the customer. Conversely, if the product configurator proposes a configuration that is desirable for the customer, the provider is more likely to leave a positive impression on the customer.

The rules are typically written by a human user (also referred to as an administrator) of the product configurator based on an understanding of the product or service being configured and possibly an intuitive or preconceived notion of what combinations of configuration attributes may be desirable for a customer. Unfortunately, these rules are not always appropriate for certain customers, yet the administrator writing the rules has little, if any, ability to recognize when certain rules are not useful. This can represent situations where the output of the configurator produces a configuration that is not feasible to manufacture or provide as a service; or even if the configuration is feasible from the perspective of the provider, the configuration may not be acceptable to the customer.

All of these approaches for writing rules for product configurators are far from ideal and are limited by the inability of the administrator to analyze large volume of configuration data and the inability of the administrator to write rules that are informed by past configurations.

SUMMARY

In an embodiment of the present disclosure, a product configuration device outputs a configuration of a product in accordance with a set of configuration rules. The product configuration device includes a rule learning system configured to acquire a first set of data representing a plurality of configurations of the product; to generate a neural network model representing the first set of data; to extract relationships between configuration attributes from the neural network model; and to modify the set of configuration rules based on the extracted relationships to generate a modified set of configuration rules for the product configuration device. The product configuration device may also include a rule execution engine that outputs the configuration of the product based on the modified set of configuration rules.

BRIEF DESCRIPTION OF THE DRAWINGS

FIGS. 6A-D are schematic representations of a variable window size algorithm in accordance with embodiments of the disclosure.

FIGS. 8A and 8B are tables to illustrate processing in accordance to embodiments of the invention

DETAILED DESCRIPTION

Figure 1:
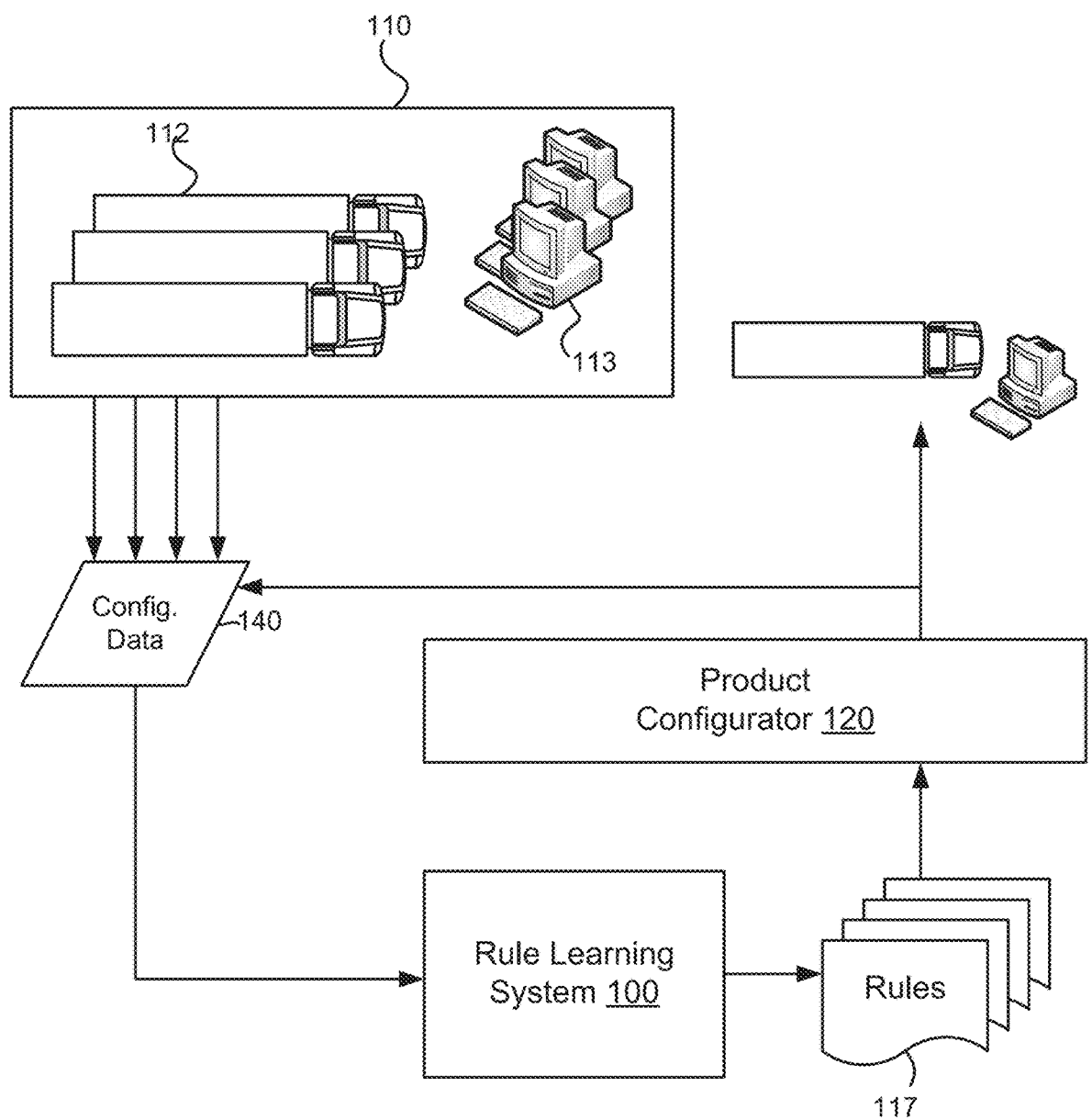
FIG. 1 is a block diagram of product configuration flow in accordance with an embodiment of the disclosure.

One embodiment is a product configurator that may include a computer system (also referred to herein as a "rule learning system") that analyzes a population of product configurations (i.e., data representing configurations of products) and generates configuration rules based on past product configurations. The system applies machine learning to the past product configurations to generate new configuration rules, update existing configuration rules, and delete configuration rules that are not appropriate. The product configurator is designed to sample all configuration attributes from a set of past configurations, learn the most closely linked or related configuration attributes, and generate configuration rules to be used for subsequent configuration of products.

The past configurations may be past output of the product configurator, or may be manually selected configurations selected by customers without the use of the product configurator, or may be a combination. For example, the past configurations may include product configurations which were initially generated by the product configurator, but were subsequently modified by the customers. Such configurations can be expected to comply with hard requirements that limit which features may or may not be present together in a particular configuration. For example, when the product being configured is heavy construction equipment, such as an excavator or mining equipment, the weight rating of a chassis (being one attribute of the configuration) and the displacement of the engine (being another attribute of the configuration) may fall within narrow range of compatible combinations. However, the interior appointment of the control cab (which includes many additional configuration attributes) is not limited by the chassis or the engine. Here, the past configuration data will reflect the customers' preferences for particular cab appointments, in combination with the chassis and engine rating.

When the product being configured is computer equipment, many other configuration attributes are possible, including: number of processors; type of processor; clock speed for each processor; built-in cache size; size of random access memory ("RAM"); type of RAM chips; mother board; graphical processing unit ("GPU"); etc. It should be readily evident that even what may be considered to be common products and services are actually highly configurable with many possible configuration attributes. It is also readily evident that the number of possible configurations (even if not all of the configurations are feasible) grows as the exponent of N, the number of configuration attributes for a given product.

An embodiment of the rule learning system disclosed herein can sample all inputs from a set of configured attributes and learn which attributes are most closely linked with each other. This is a task that cannot be performed by the human administrator due to the complexity involved in recognizing a pattern, even when the problem space is simplified to only increase as $N^2$, using a data set with N by N data cells (where N denotes the number of configuration attributes in a particular product). In many configurations N exceeds 100, resulting in a matrix with 10,000 cells. Machine learning, however, can be used to detect hidden patterns in such data and can generate rules to be applied to new product configurations.

Referring to FIG. 1, an exemplary collection 110 of configurable products is shown. This collection is not limited to the products shown, which includes transportation machinery 112 and computer hardware 113. As will be appreciated, many other products can be configured, but these examples are useful for understanding the complexity of configuring products, and the need for establishing configuration rules that will be executed by a product configurator 120 in accordance with embodiments of the disclosure.

Data that represents past configurations of collections of products 110 can be collected both from past execution of product configurator 120, but also from commercial data providers, market research, or modeling. In one embodiment, the configuration data 140 is collected in one or more data files, which may be in a comma separated volume ("CSV") format, as will be discussed below. While only a single configuration data element is illustrated, the disclosure is not limited to one data file, or to any particular file format. The data could be stored in a database, or other data storage devices.

The population of past configurations may be data that was previously output by product configurator 120, as shown in FIG. 1, but it does not have to be. It is possible to obtain large data sets of product configurations that were configured by different product configurators, or configured without any product configurator. Such data sets are useful and contain information based on many decisions made by product configurators and by human users. Embodiments disclosed herein provide an ability to convert data from various formats into a suitable machine readable format for discovering hidden patterns in the data.

Figure 2:
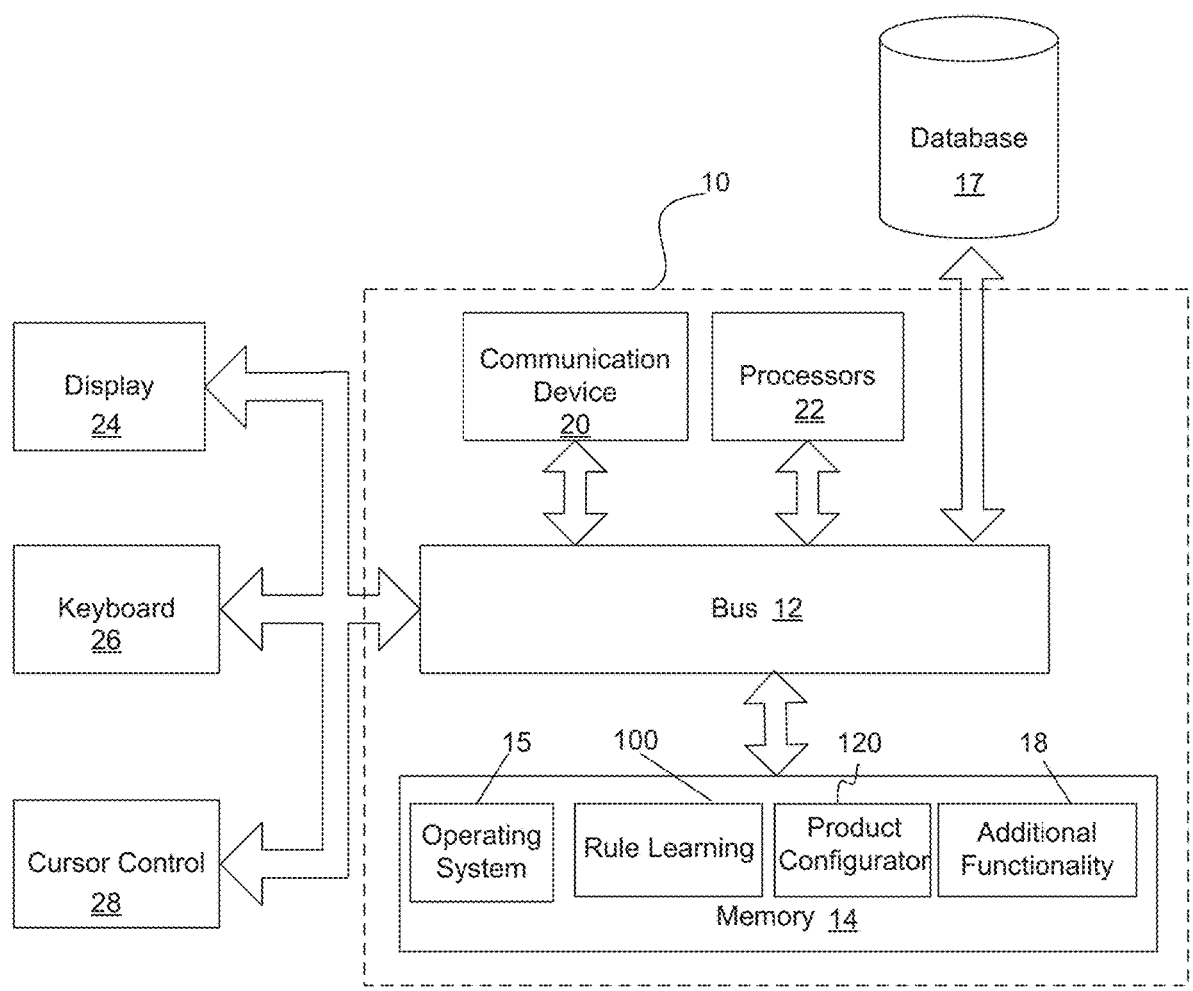
FIG. 2 is a block diagram of a computer server/system in accordance with an embodiment of the disclosure.

Configuration data 140 is received as input by rule learning system 100 and processed to generate rules 117. Rule learning system 100 may be implemented as one or more software modules on a general purpose computer 10, or in other hardware configurations, as shown in FIG. 2. It will be appreciated that rule learning system 100 may be implemented in specialized hardware that is specifically configured to perform the machine learning tasks, described below, more efficiently than a general purpose computer.

FIG. 2 is a block diagram of a computer server/system 10 in accordance with an embodiment of the disclosure. Although shown as a single system, the functionality of system 10 can be implemented as a distributed system. System 10 collectively can implement product configurator 120 of FIG. 1. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 2, such as a keyboard or display.

System 10 includes a bus 12 or other communication mechanism for communicating information, and one or more processors 22 (for simplicity, referred to as processor 22) coupled to bus 12 for processing information. Processor 22 may be any type of a general or a specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a rule learning module 100 that generates configuration rules based on configuration data, and all other functionality disclosed herein. System 10 can be part of a larger system. Therefore, system 10 can include one or more additional functional modules 18 to include the additional functionality, such as "Oracle Configurator" from Oracle Corp., Oracle CPQ, or an enterprise resource planning ("ERP") system from Oracle Corp. The configure price quote ("CPQ") software can help service providers quote the cost for complex and highly configurable products. The system can help companies understand market conditions based on past configurations and current market trends. The system can recommend configurations and pricing for products and services, and also to project future demand. This process reduces errors boosts sales productivity. Risk of missed opportunities due to insufficient time to respond is reduced. Quotes become more accurate. Knowledge about product configuration is captured in the form of rules assisting the retention of crucial product and process knowledge, mitigating the risk of knowledge drain.

A database 17 is coupled to bus 12 to provide centralized storage for modules 100 and 18 and store customer data, product data, transactional data, etc. The configuration data 140 may also be stored in the database 17. In one embodiment, database 17 is a relational database management system ("RDBMS") that can use Structured Query Language ("SQL") to manage the stored data.

In one embodiment, particularly when there are a large number of configuration attributes or large number of configuration data items to be processed by rule learning system 100, database 17 can be implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Embodiments use configuration data 140 to generate one or more rules to be executed by product configurator 120 to configure products and services offered to customers.

Figure 3:
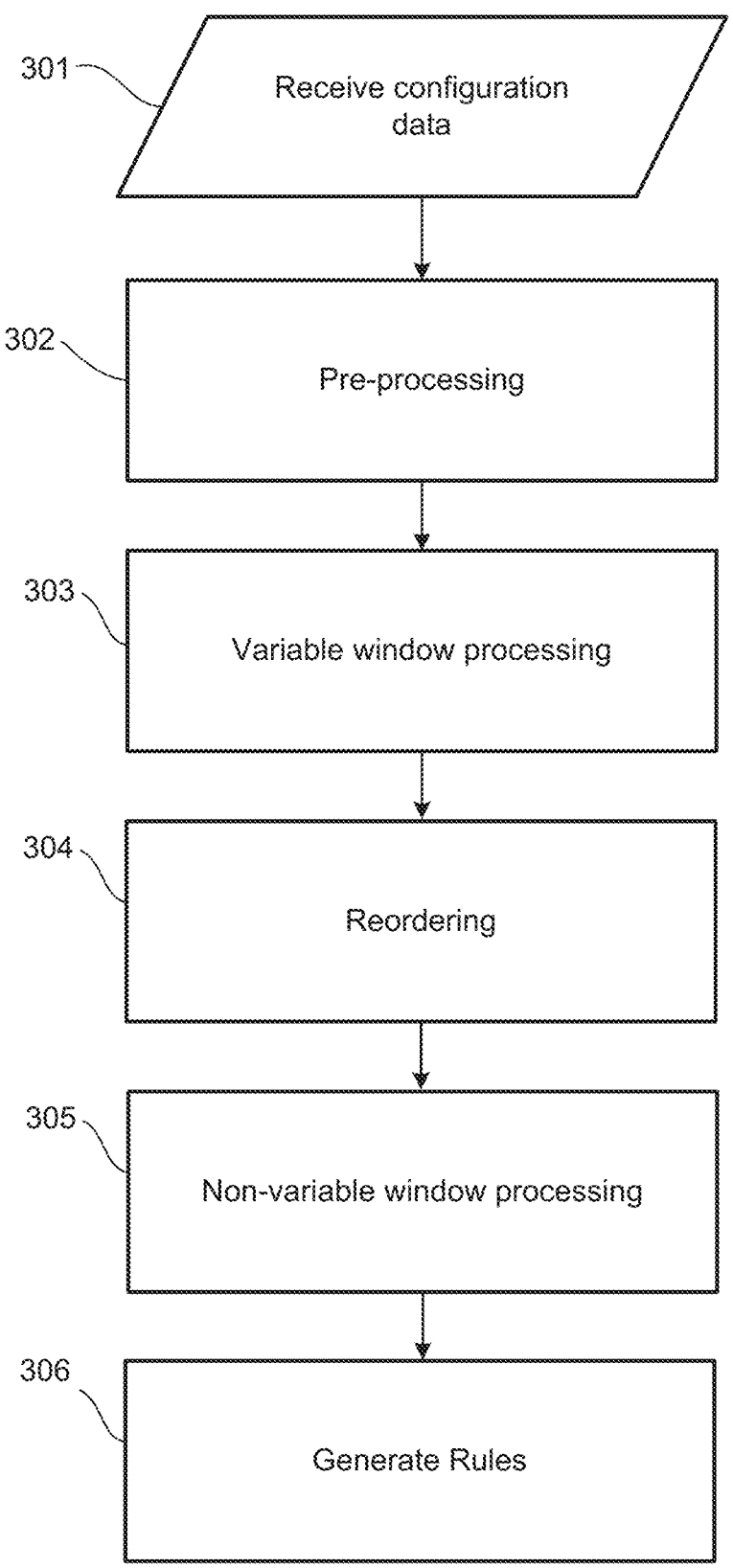
FIG. 3 is a flow diagram of the functionality of rule learning module of FIG. 1 in accordance with an embodiment of the disclosure.

FIG. 3 is a flow diagram of the functionality of rule learning system 100 for generating rules that will be executed by product configurator 120. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. A detailed description of the process flow follows after a brief introduction. At a high level, the process applies machine learning to configuration data that can span many individual examples of product configurations to identify hidden patterns of relationships among configuration attributes and to propose new rules based on those relationships. For example, in the context of a computer system configuration, a relationship may exist between a particular model of a server and the type of a service plan that is selected by the customer. The machine learning uses a shallow but wide neural network that learns about the relationships as configuration data is used to train the neural network. Neural networks are well suited for identifying patterns or trends in data.

Embodiments of the disclosed process flow begin by receiving configuration data which represents any number of configurations of a particular product. The configurations are converted, if needed, into a suitable representation of distinct configuration attribute plus value pairs. This representation is fed into a variable window processor algorithm, thereby producing an intermediate result that identifies relationships between the distinct configuration attribute and value points. Subsequently, the intermediate result is reordered in a particular fashion to position attributes that are most closely linked (in the intermediate result) next to each other. This reordered data set is processed again, but this time with a non-variable (or fixed) window size process to identify exact relationship matches. The result can be expressed as a vector that identifies a level of relationship between all configuration attributes that were used as input to train the machine learning system. Finally, the strength of the relationships can be used to create new rules, or modify or delete existing rules.

At 301, configuration data 140 is received by the system 100. The configuration data 140 may be provided by a CPQ system, such as Oracle CPQ. In embodiments, the configuration data 140 may be the output of product configurator 120, but can also be received from commercial data aggregators or as output of modeling.

In an embodiment, configuration data from Oracle CPQ is provided as a portion of a product quote to a customer at the conclusion of the customer's transaction. For example, the customer may configure a particular computer server and software combination to address the customer's particular computation needs. The combination of configuration attributes defines the particular configuration. The configuration attributes may include: a model identification; color; height; chassis material; product type; service plan provided with the server; and a list of extras.

In an embodiment where the product being configured is a laptop, the configuration attributes may include the following.

System
Model
Processor
OperatingSystem
Size
Memory Modules
Speed
Capacity
Resolution
Graphics Card
Touch Screen
Wireless Broadband
Virus Protection
Productivity
Security
Term
Type
Dedicated Helpdesk Support Time
Region
Phone
Vision Cloud Backup
Mouse
Keyboard
Additional Display
Power Supply
Docking Station
External Storage
Travel Case
Vision Wireless Utility
Processor Image
Model Description In an embodiment where the product being configured is a server, the configuration attributes may include the following.

Packaged Solutions
Tier
Server Module
Servers
Override Low Quantity
Blades
Server Rack
Enclosures Required
Enclosure
Remaining Blade Slots
Blade Enclosure Image
Total Equipment
Power Supply
Redundant Power Supply
Processor
Number of Processors
RAM
RAM Configuration
Hard Drive
Additional HDD's
HD Control
Additional Hard Drive
Cloud Backup
Cloud Storage
Cloud Service
Optical Drive
Floppy Drive
Server Counter
Server
Memory
RAM
Primary HD
Power Supply
Operating System
OS Licenses
Volume Price Information
Rebate
Campaign
Application Counter
Software Package
Licenses
Maintenance
Qty
Start Date
End Date
Support Level
Monitoring
Services Requested
Modify Service Details
Service Counter
Resource
Service Detail
Resources
Rate Level
Hours
Flex
Price
SLA Counter
SLA Server
SLA Processor
SLA RAM
SLA HardDrive
SLA OS
SLA Price
Multi Select Test
Header Text Testing Recognizing that the configuration attributes may be provided in various formats, the flow diagram continues at 302 with pre-processing of the configuration data into a machine readable format. In an embodiment, the configuration attributes listed above will get translated into a machine readable format as shown in Table 1 below. In this embodiment, the configuration attribute and its value are concatenated into a single string shown below, which results in distinct learnable unique values for every input. Thus, every unique pair of a configuration attribute and its value is represented by a single unique identifier.

TABLE 1

| Configuration Attribute | Value | Machine Readable |
| --- | --- | --- |
| Model Identification | 1553256 | model_id_1553256 |
| Color | green | color_green |
| Height | 5 (ft) | height_5 |
| Chassis (material) | bare metal | chassis_bareMetal |
| Product Type | PowerServer | product_type_PowerServer |
| Service Plan (duration) | 1 year | service_plan_1yr |
| Extras | None | extras_none |

It will be appreciated that the above example is simplified to aid understanding, and that the number of configuration attributes may exceed 10, 20, 50, or even 100. Further, in subsequent examples the configuration attributes may be simply identified as "a," "b," "c," etc., or any other identifier, for convenience.

The table of FIG. 8A illustrates another example of input that will be carried through the entire processing to highlight the features of the disclosed processing algorithm.

In the table of FIG. 8A, the column headings "_a," "_b," "_c," "_d," "_e," "_f," and "_g" represent configuration attributes. The capital letters in the table represent configuration attribute values. Thus, the first row of the table identifies a configuration where attribute _a has the value A, attribute _b has the value D, attribute _c has the value V, attribute _d has the value Y, attribute _e has the value M, attribute _f has the value T, and attribute _g has the value P. The table represents 10 different configurations that are used as input to rule learning system 100.

At 302, each row will be converted into a format that concatenates the configuration attribute and the corresponding values. In the above example, the first row (i.e., the first configuration in the set of past configurations) can be converted into a string "_a_A, _b_D, _c_V, _d_Y, _e_M, _f_T, _g_P." The concatenated configuration attribute and its value will be referred to as "distinct learnable unique values." In the example of the table of FIG. 8A, there are 23 distinct learnable unique values: (_a_A, _a_O, _a_G, _b_D, _b_F, _b_I, _c_V, _d_H, _d_R, _d_Y, _e_C, _e_E, _e_M, _e_N, _e_S, _e_U, _f_L, _f_Q, _f_T, _f_W, g_J, _g_K, and _g_P). The number of distinct learnable unique values in a particular set of configuration that will be processed by rule learning system 100 will be referred to as Z.

Figure 7:
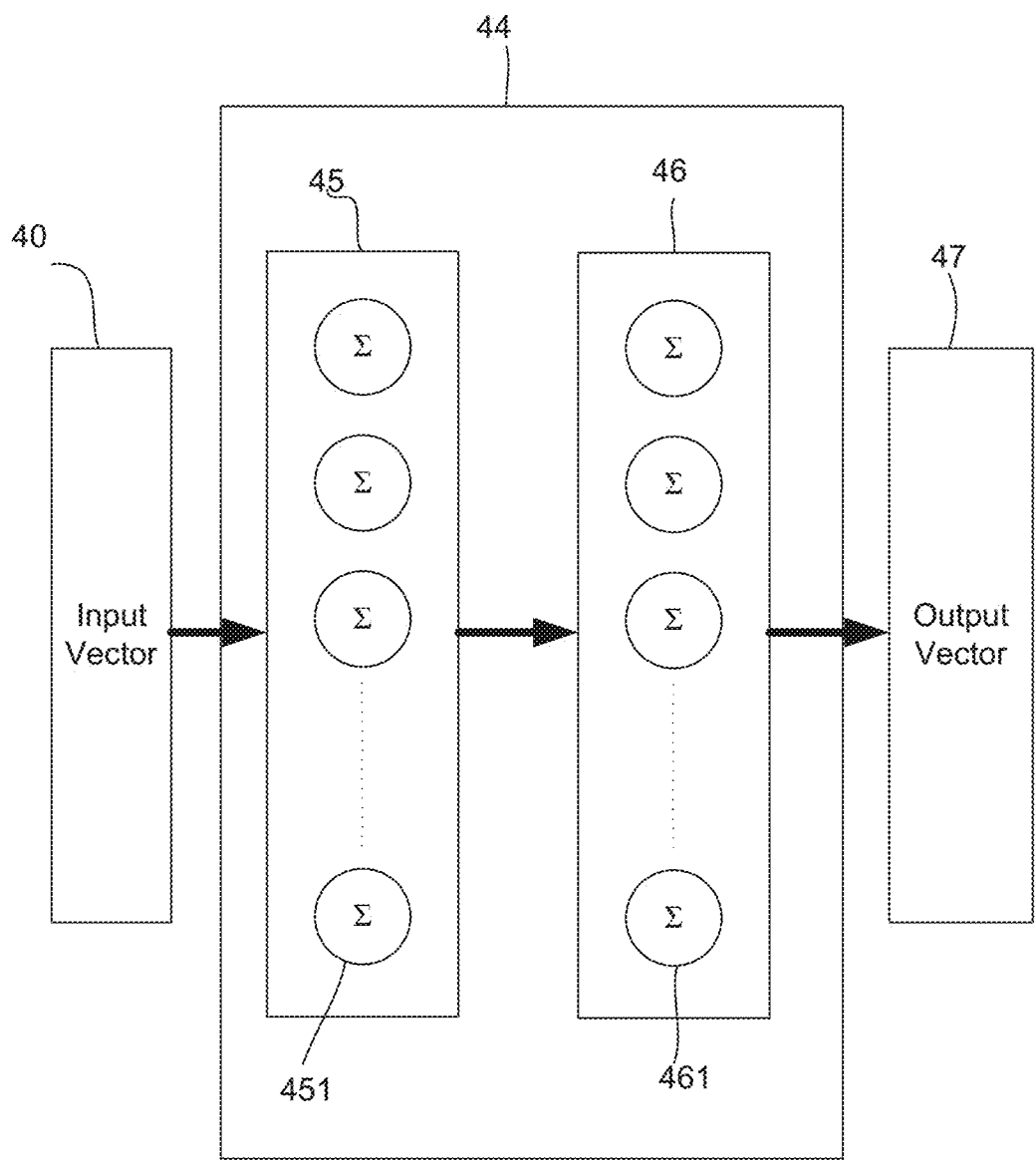
FIG. 7 is a schematic representation of a neural network layer in the rule learning system in accordance with an embodiment of the disclosure.

At 303, the configuration string corresponding to each row (i.e., a single instance of a configuration) is fed into a variable window size processor algorithm. In an embodiment, the variable window processor algorithm is implemented as a neural network with a skip gram neural network architecture, with a single hidden layer. FIG. 7 illustrates additional details of an embodiment of the neural network. A discussion of the neural network follows later.

The variable window size process first chooses a desired attribute to start with. The process then chooses a set of attributes to associate to that desired attribute at differing intervals from it. The first selection might be the two attributes spatially closest to that attribute (i.e., its neighbors). The second selection might skip the closest attribute and choose the next 2 closest instead. This can continue with that pattern. In an embodiment, a specific pattern is followed such that the desired attribute is selected based on the specific pattern, and the set of attributes to associate with the desired attribute is also defined by the specific pattern. In an embodiment, the window size and distance from the desired attribute varies randomly.

By applying the variable window process, each attribute in the list of possible attributes gets an opportunity to record a relationship with the desired attribute. This association is not necessarily recorded at every iteration of the process. In an embodiment, the variable window process guarantees that a subset of the list of all attributes will record associations for two arbitrary attributes.

The table of FIG. 8B includes the same data as the table of FIG. 8A and illustrates an exemplary flow of the variable window size process. In an embodiment, the window moves by one position at every iteration of the process. In the table of FIG. 8B, the cells with attribute values in boxes would be associated together.

It is evident that while _a only gets an opportunity to feed a correlation with _b into the learner twice (at row 1 and 7), _a gets to register a correlation with every column at least once. This allows embodiments of the disclosure to find relationships between attributes that are not geographically connected (i.e., not spatially near each other), while using a widow size that is not as large as the total number of configuration attributes.

It will be appreciated that each row of the table of FIG. 8B can be processed by the variable window size process multiple times such that the pattern of boxes shown in the cells of the table of FIG. 8B, or a portion of the pattern, is applied each row. In this case, it is possible to record a correlation between the desired attribute, and every other attribute.

Figures 6A, 6B, 6C:
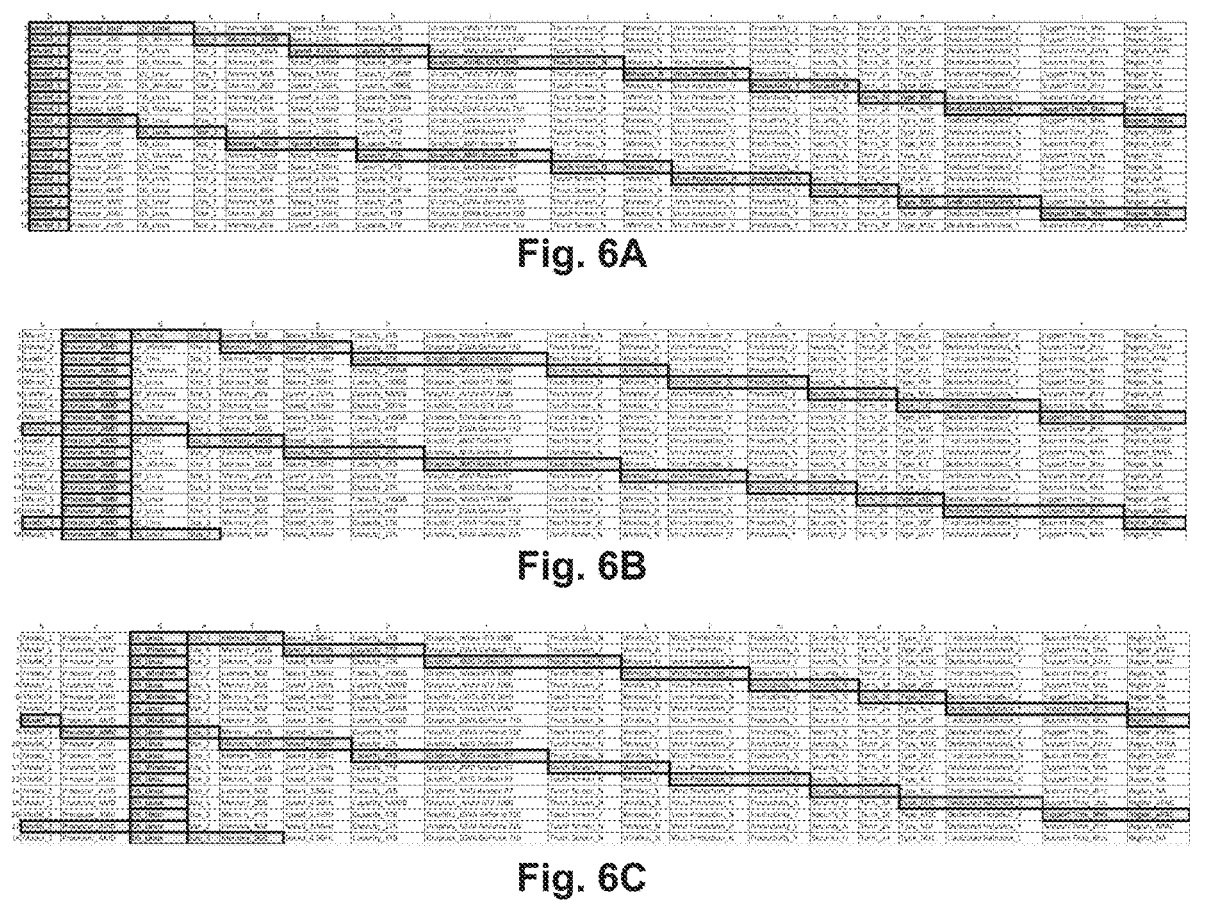

Referring to FIGS. 6A-C, another example of execution of the variable window processing is shown. FIG. 6A illustrates an iteration where the desired attribute is in column "b" and 18 configurations are considered, one in each row. For each configuration, a window of size 2 is shown with a bold outline and shading. FIG. 6B illustrates the same 18 configurations and the same pattern of the window of size 2 moving, but the desired attribute is in column c. FIG. 6C illustrates the same 18 configurations and the same window pattern, but the desired attribute is in column d.

Figure 6D:
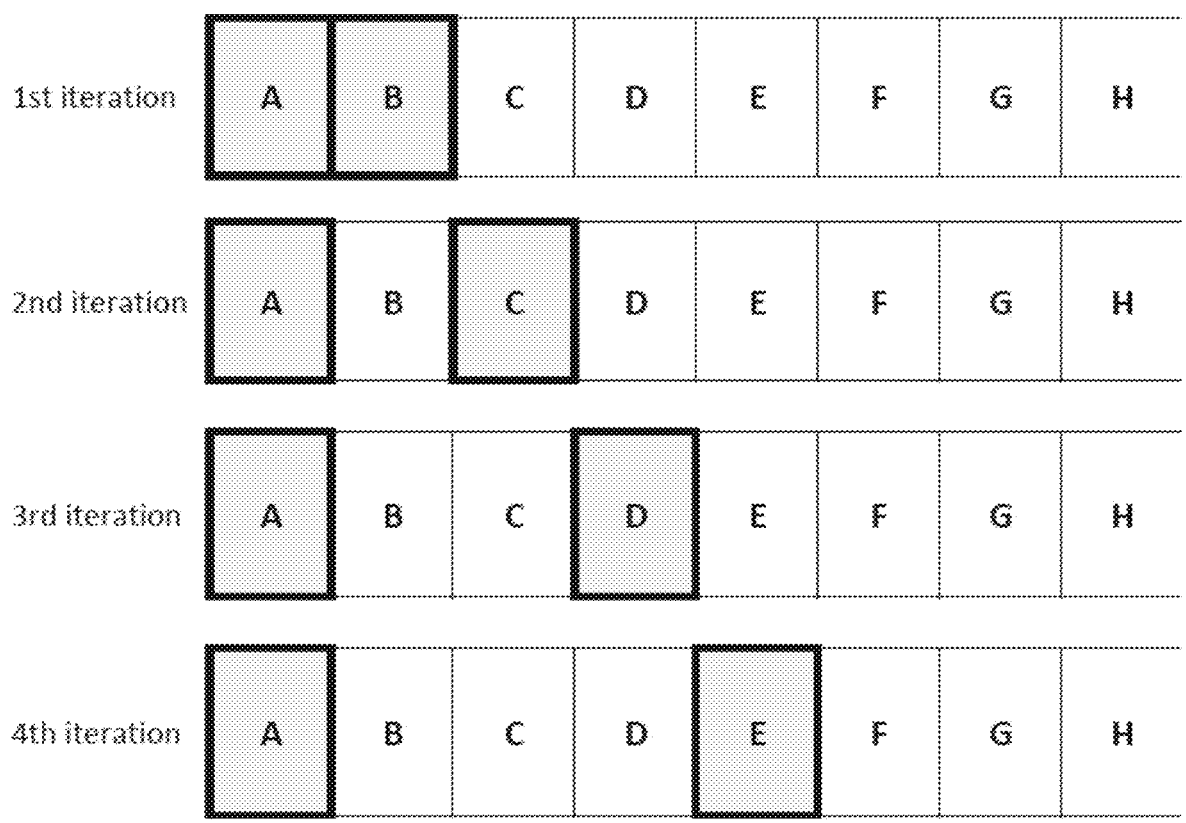

Referring to FIG. 6D, a simplified example of the variable window processing is shown with the corresponding output to further illustrate embodiments of the process. In FIG. 6D, a single configuration with configuration attributes A, B, C, D, E, F, G, H, I, and J is shown at four iterations of the variable window process. The window size has a length of 1, hence only a single attribute is considered in connection with the desired attribute.

At the first iteration, the desired attribute is "A" and the window looks immediately adjacent at attribute B, resulting in an association of "A→B." In the next iteration shown in FIG. 6D, the desired attribute is still "A," but the window has moved to the right by one attribute, arriving at "C." This results in the association of "A→C." This process continues as shown in FIG. 6D, with additional associations "A→D" and "A→E." It will be appreciated that this example only shows one side of the window, so as the desired attribute changes, the window also looks to other attributes on the left side of the desired attribute.

The following description of the non-variable window processor further highlights the functioning of the variable window size processor. The input layer gets parsed to construct a set of the distinct learnable unique values described above, creating the input and output domain of the problem. The size of that domain will be the number of distinct attribute values in the input data set. The learner itself will then iterate over the input list in a window of size X to create a set of binary word mappings. In an embodiment, the window size X is set to a fixed value, 2. In another embodiment, X is set to 3. As described below, the window size indicates how far back and how far forward (in terms of number of elements in an input string) the process looks.

When X is set to two, the input will be a 1 by Z vector, where Z depends on the input data set. Continuing with the example in Table 1 above, an input string would contain: "model_id_1553256, color_green, height_5, chassis_bareMetal, product_type_PowerServer, service_plan_1yr,extras_None." This is seven unique elements separated by commas.

Figure 4:
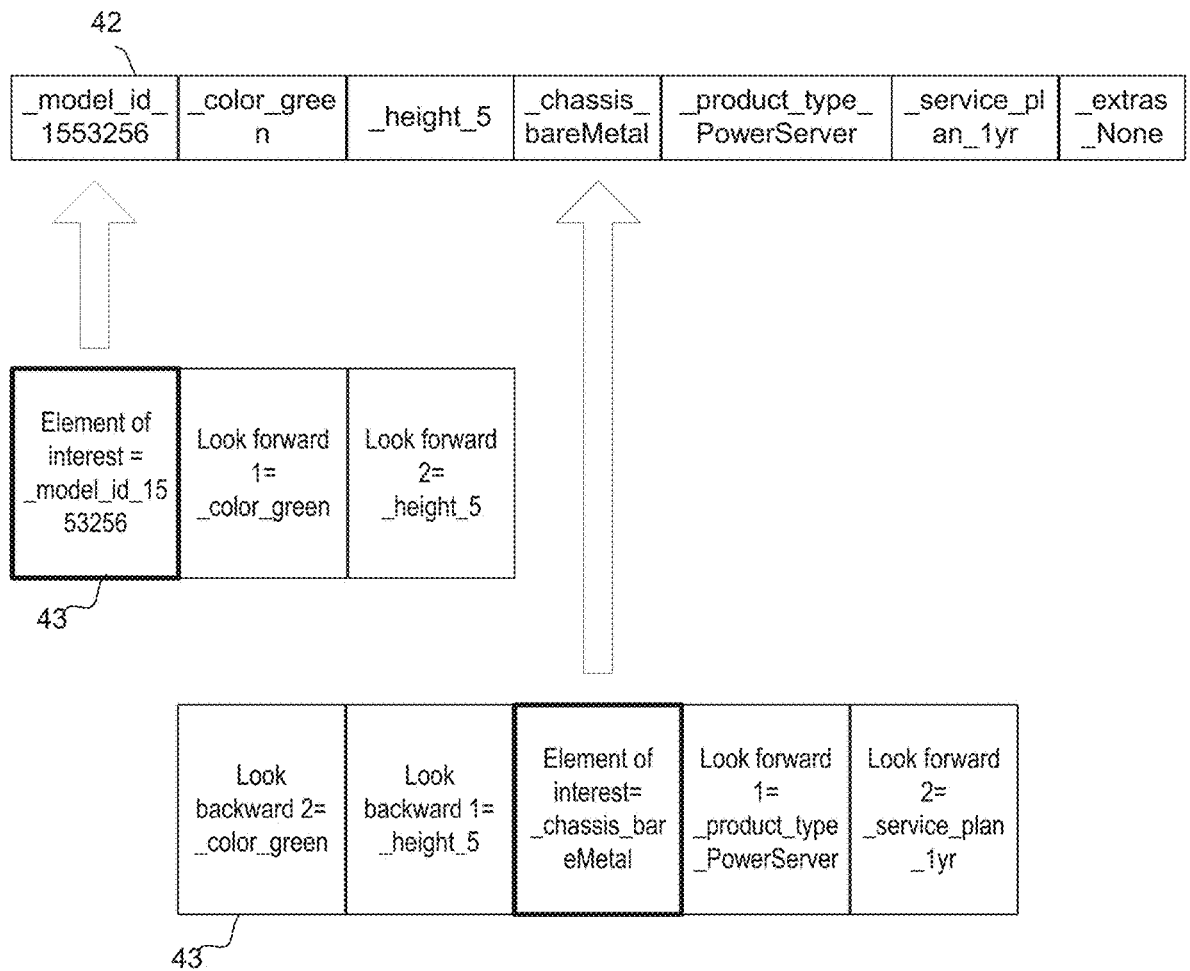
FIG. 4 is a schematic representation of a non-variable window algorithm in accordance with an embodiment of the disclosure.

When the window size is 2, the learner will iterate over the string, as shown in FIG. 4, generating a set of binary mappings shown below. FIG. 4 illustrates a sliding window 43 of length 2, shown at two different instance in time. Window 43 has a fixed size—in the example of FIG. 4 the length is 2. This means that two elements ahead and two elements behind the element of interest are included in the window as it slides along the input string. Referring again to FIG. 4, when the element of interest is model_id_1553256, which is the first element of the input string, there are no elements behind, hence window 43 is shown only extending forward (to the right in the page of FIG. 4). Window 43 slides to the right along the input string, with the element of interest changing at each iteration. When the element of interest is "chassis_bareMetal", the window includes elements "color_green", "height_5", "product_type_PowerServer", and "service_plan_1yr". When window 43 slides along the entire input string shown in FIG. 4, the following listing of relationships represents the resulting output.

model_id_1553256→color_green
model_id_1553256→height_5
color_green→model_id_1553256
color_green→height_5
color_green→chassis_bareMetal
height_5→model_id_1553256
height_5→color_green
height_5→chassis_bareMetal
height_5→product_type_PowerServer chassis_bareMetal→color_green
chassis_bareMetal→height_5
chassis_bareMetal→product_type_PowerServer
chassis_bareMetal→service_plan_1yr
product_type_PowerServer→height_5
product_type_PowerServer→chassis_bareMetal
product_type_PowerServer→service_plan_1yr
product_type_PowerServer→extras_None
service_plan_1yr→chassis_bareMetal
service_plan_1yr→product_type_PowerServer
service_plan_1yr→extras_None
extras_None→product_type_PowerServer
extras_None→service_plan_1yr As shown in FIG. 4, input string 42 has 7 distinct elements. Window 43 of length 2 (in terms of elements) is moved over the input string 42, such that for each element of interest, the length of the window determines how far forward and backward the process looks. For example, when the element of interest is "model_id_1553256", the window of length 2 constrains a look backward to a null set, as there are no elements to the left of the element of interest, and returns two results "model_id_1553256→color_green" and "model_id_1553256→height_5" when looking forward (to the right in the figure). When the element of interest is "chassis_bareMetal", the output are the four relationships: "chassis_bareMetal→color_green; chassis_bareMetal→height_5; chassis_bareMetal→product_type_PowerServer; chassis_bareMetal→service_plan_1yr." All of the relationships produced by a window of size 2 are shown above.

It is evident from above that the attribute associations are binary and they go both ways with this mapping. Also the number of inputs for a string of length M (where M is expressed as the number of attributes) and a window of size X is going to be 2MX−(X+1)*X. It will be appreciated that a human administrator of the system would be unable to analyze a data set of any significant configuration.

Once this intermediate input is created, it is mapped to a one hot encoded vector 40 in FIG. 4. A one hot encoded vector contains a value of 1 for every attribute that is reflected in the training data set, and the remaining values will be 0. The total size of the input vector is the number of possible configuration attributes for the particular product or service that will be configured. In the example above, only seven attributes (listed in Table 1) are represented in the training data set, but this does not mean that those are the only possible configuration attributes of the of this product. On the contrary, many more configuration attributes are envisioned. In an embodiment, the number of configuration attributes is 100.

The above example uses a fixed size of the window, but the present disclosure recognizes disadvantages with the fixed window size and presents an improved approach that leads to more reliable predictions of product configurations, which in turn result in better configuration rules from rule learning system 100.

The limitations of the fixed window size processing are illustrated in terms of the example below. The input data in this instance includes 20 sets of configurations. Here, the configuration attributes are "a," "b," "c," "d," and "e" (in lower case). The values of the configuration attributes are expressed as capital letters. Table 3, below, lists the sample input set.

TABLE 3

| _a | _b | _c | _d | _e |
|----|----|----|----|----|
| A  | E  | G  | J  | L  |
| A  | E  | G  | J  | L  |
| B  | E  | G  | J  | L  |
| B  | F  | I  | K  | N  |
| C  | F  | H  | J  | M  |

TABLE 3-continued

| _a | _b | _c | _d | _e |
|----|----|----|----|----|
| C  | F  | H  | J  | M  |
| A  | E  | G  | J  | L  |
| A  | F  | H  | J  | M  |
| B  | E  | G  | J  | L  |
| B  | F  | I  | K  | N  |
| C  | F  | H  | J  | M  |
| C  | F  | H  | J  | M  |
| A  | E  | G  | J  | L  |
| A  | E  | G  | J  | L  |
| A  | E  | G  | J  | L  |
| A  | E  | G  | J  | L  |
| A  | E  | H  | K  | M  |
| A  | E  | H  | K  | M  |
| B  | F  | I  | K  | L  |
| B  | F  | I  | K  | M  |

The fixed window size algorithm will fail to find rule connections if the attributes input are far away. The problem with learning, e.g., If _a==B then set _e=L, is that the attributes that should be learned as have a connection are outside of the window of size 2.

This would be a significant problem as the number of attributes getting passed into a rule learner from configuration will be large and making a single window large enough to encompass them all would require a significant amount of resources. The number of data points scales as a multiple of window size. Each data point is a pair of attributes that appear together. If the window size is 10, then there would be 20 pairs of attributes generated per attribute per line. If the window size is 2, then there would only be 4 generated per attribute per line.

Embodiments of the present disclosure fix this problem and at the same time make the computer system 10 of FIG. 2 run faster and more efficiently to solve the same problem. It is evident that the disclosed embodiments provide an improvement in how the computer system 10 operates due to improved efficiency of the neural network algorithm explained below.

At 303 of FIG. 3, the window is set to varying sizes, thus having varying distances away from the point of interest that is getting learned at every iteration. This distance will increase with every iteration so that each iteration is sampling a different set of attributes. This will have two effects. First, it will establish a relationship between all configuration attributes passed into the algorithm and make it so the algorithm is agnostic to the order in which attributes are fed into it. This effectively samples all attributes in the input.

Another effect is that it will dilute the density of attributes within samples. If a neighbor had a 100% relationship with the previous algorithm the sampling will bring that down to the ratio of the window size to the number of attributes. So, it will take longer to learn of a relationship between 2 neighbors and the learned relationship will be lower than what it really is. This is because with the window moving, instead of every window containing 2 attributes, now it may be every fifth or tenth window. This gives fewer data points to establish a relationship. However, this apparent shortcoming is addressed at 304 and 305, described below.

After 303, the rule learning system reorders the input values to bring the most likely connected attributes into the same region to run through the non-variable window processing at 305. The reordering links attribute recommendations together by how heavily they are connected to determine the order in which attributes should be supplied into the non-variable window processing at 305. Referring to the example of the table of FIG. 8A, the output of the variable window processing will look as shown in Table 4 below.

TABLE 4

|   | A | C | D | E | F | G | H | I | J | K | L | M |
|---|---|---|---|---|---|---|---|---|---|---|---|---|
| A | 0 | 0 | 0.09 | 0 | 0.09 | 0 | 0 | 0 | 0 | 0 | 0 | 0.04 |
| C | 0 | 0 | 0 | 0 | 0.23 | 0 | 0 | 0 | 0.24 | 0 | 0 | 0 |
| D | 0.22 | 0 | 0 | 0 | 0 | 0 | 0 | 0 | 0.12 | 0 | 0 | 0 |
| E | 0 | 0 | 0 | 0 | 0 | 0 | 0 | 0 | 0 | 0.24 | 0.25 | 0 |
| F | 0.13 | 0.06 | 0 | 0.12 | 0 | 0.13 | 0 | 0 | 0 | 0 | 0.06 | 0 |
| G | 0 | 0 | 0 | 0.10 | 0.12 | 0 | 0 | 0.06 | 0 | 0.17 | 0.13 | 0.06 |
| H | 0 | 0 | 0.07 | 0 | 0 | 0 | 0 | 0.09 | 0.18 | 0 | 0 | 0 |
| I | 0 | 0 | 0 | 0 | 0 | 0.15 | 0.15 | 0 | 0 | 0.15 | 0 | 0 |
| J | 0 | 0.06 | 0.05 | 0 | 0.05 | 0 | 0.11 | 0.07 | 0 | 0 | 0 | 0 |
| K | 0 | 0 | 0 | 0.10 | 0.10 | 0.18 | 0 | 0.06 | 0 | 0 | 0.13 | 0.04 |
| L | 0 | 0 | 0 | 0 | 0.18 | 0 | 0 | 0 | 0 | 0.32 | 0 | 0 |
| M | 0 | 0 | 0 | 0 | 0 | 0.12 | 0 | 0.12 | 0 | 0.12 | 0 | 0 |
| N | 0 | 0 | 0 | 0 | 0 | 0 | 0 | 0 | 0 | 0 | 0 | 0 |
| O | 0 | 0.05 | 0.05 | 0 | 0.06 | 0 | 0.11 | 0.05 | 0.16 | 0 | 0 | 0 |
| P | 0.17 | 0 | 0.08 | 0 | 0.08 | 0 | 0 | 0 | 0 | 0 | 0 | 0.04 |
| Q | 0.17 | 0 | 0 | 0 | 0 | 0 | 0 | 0 | 0.17 | 0 | 0 | 0 |
| R | 0.07 | 0.04 | 0.03 | 0.03 | 0.11 | 0.06 | 0 | 0.03 | 0.03 | 0.06 | 0.04 | 0.03 |
| S | 0.12 | 0 | 0 | 0 | 0.12 | 0 | 0 | 0.13 | 0.13 | 0 | 0 | 0 |
| T | 0 | 0 | 0.08 | 0 | 0 | 0.08 | 0.07 | 0 | 0.16 | 0.08 | 0 | 0.16 |
| U | 0.12 | 0 | 0 | 0 | 0.12 | 0 | 0.12 | 0 | 0.12 | 0 | 0 | 0 |
| V | 0.10 | 0 | 0.07 | 0.05 | 0.12 | 0.07 | 0.02 | 0.05 | 0.05 | 0.02 | 0 | 0.02 |
| W | 0.16 | 0 | 0 | 0 | 0.34 | 0 | 0 | 0 | 0 | 0 | 0 | 0 |
| Y | 0.10 | 0 | 0.06 | 0.05 | 0.12 | 0.06 | 0 | 0 | 0 | 0.05 | 0.06 | 0.05 |
| SUM | 1.38 | 0.22 | 0.58 | 0.46 | 1.84 | 0.85 | 0.58 | 0.67 | 1.37 | 1.22 | 0.68 | 0.46 |

|   | N | O | P | Q | R | S | T | U | V | W | Y |
|---|---|---|---|---|---|---|---|---|---|---|---|
| A | 0.04 | 0 | 0.16 | 0.06 | 0.08 | 0.05 | 0.04 | 0.03 | 0.18 | 0.08 | 0.07 |
| C | 0 | 0.30 | 0 | 0.23 | 0 | 0 | 0 | 0 | 0 | 0 | 0 |
| D | 0 | 0.12 | 0.11 | 0 | 0 | 0 | 0.11 | 0 | 0.21 | 0 | 0.11 |
| E | 0 | 0 | 0 | 0 | 0.12 | 0 | 0 | 0 | 0.25 | 0 | 0.14 |
| F | 0 | 0.06 | 0.07 | 0 | 0.06 | 0.07 | 0 | 0 | 0 | 0.15 | 0.08 |
| G | 0 | 0 | 0 | 0 | 0.10 | 0 | 0.05 | 0 | 0.16 | 0 | 0.05 |
| H | 0 | 0.18 | 0 | 0 | 0 | 0.07 | 0.16 | 0.08 | 0.17 | 0 | 0 |
| I | 0 | 0.20 | 0 | 0 | 0 | 0 | 0 | 0 | 0.34 | 0 | 0 |
| J | 0 | 0.17 | 0 | 0.07 | 0.05 | 0.05 | 0.10 | 0.06 | 0.16 | 0 | 0 |
| K | 0 | 0 | 0 | 0 | 0.12 | 0 | 0.05 | 0 | 0.16 | 0 | 0.05 |
| L | 0 | 0 | 0 | 0 | 0 | 0 | 0 | 0 | 0.34 | 0 | 0.16 |
| M | 0 | 0 | 0.13 | 0 | 0 | 0 | 0.24 | 0 | 0.15 | 0 | 0.13 |
| N | 0 | 0 | 0.25 | 0.29 | 0.22 | 0 | 0 | 0 | 0.23 | 0 | 0 |
| O | 0 | 0 | 0 | 0.05 | 0.05 | 0.05 | 0.12 | 0.07 | 0.17 | 0 | 0 |
| P | 0.03 | 0 | 0 | 0.05 | 0.08 | 0.03 | 0.06 | 0.04 | 0.17 | 0.08 | 0.08 |
| Q | 0.15 | 0 | 0.17 | 0 | 0.17 | 0 | 0 | 0 | 0.16 | 0 | 0 |
| R | 0.03 | 0.03 | 0.07 | 0.07 | 0 | 0.03 | 0.03 | 0 | 0.16 | 0.03 | 0 |
| S | 0 | 0.13 | 0.13 | 0 | 0 | 0 | 0.12 | 0 | 0 | 0.12 | 0 |
| T | 0 | 0.10 | 0.09 | 0 | 0 | 0.09 | 0 | 0 | 0 | 0 | 0.09 |
| U | 0 | 0 | 0.13 | 0 | 0 | 0 | 0.12 | 0 | 0.13 | 0.13 | 0 |
| V | 0.02 | 0.08 | 0.05 | 0.03 | 0.05 | 0 | 0.05 | 0.02 | 0 | 0.05 | 0.05 |
| W | 0 | 0 | 0.35 | 0 | 0 | 0 | 0 | 0 | 0.15 | 0 | 0 |
| Y | 0 | 0 | 0.12 | 0 | 0 | 0 | 0.06 | 0.05 | 0.16 | 0.06 | 0 |
| SUM | 0.27 | 1.37 | 1.83 | 0.84 | 1.10 | 0.44 | 1.30 | 0.36 | 3.45 | 0.70 | 1.00 |

The column and row headings in Table 4 simply list the configuration attribute value, but the value represents the combination of configuration attribute and its associated value. For example, the value "A" represents "_a_A" and the value Y represents "_d_Y" as explained above with reference to the table of FIG. 8A. This example is selected such that the values are only present in a particular configuration attribute, and do not overlap. For example, the values A, O, and G are only present as values of the configuration attribute "_a" in the table of FIG. 8A, making it possible to use the shorthand representation shown in Table 4.

Figure 5:
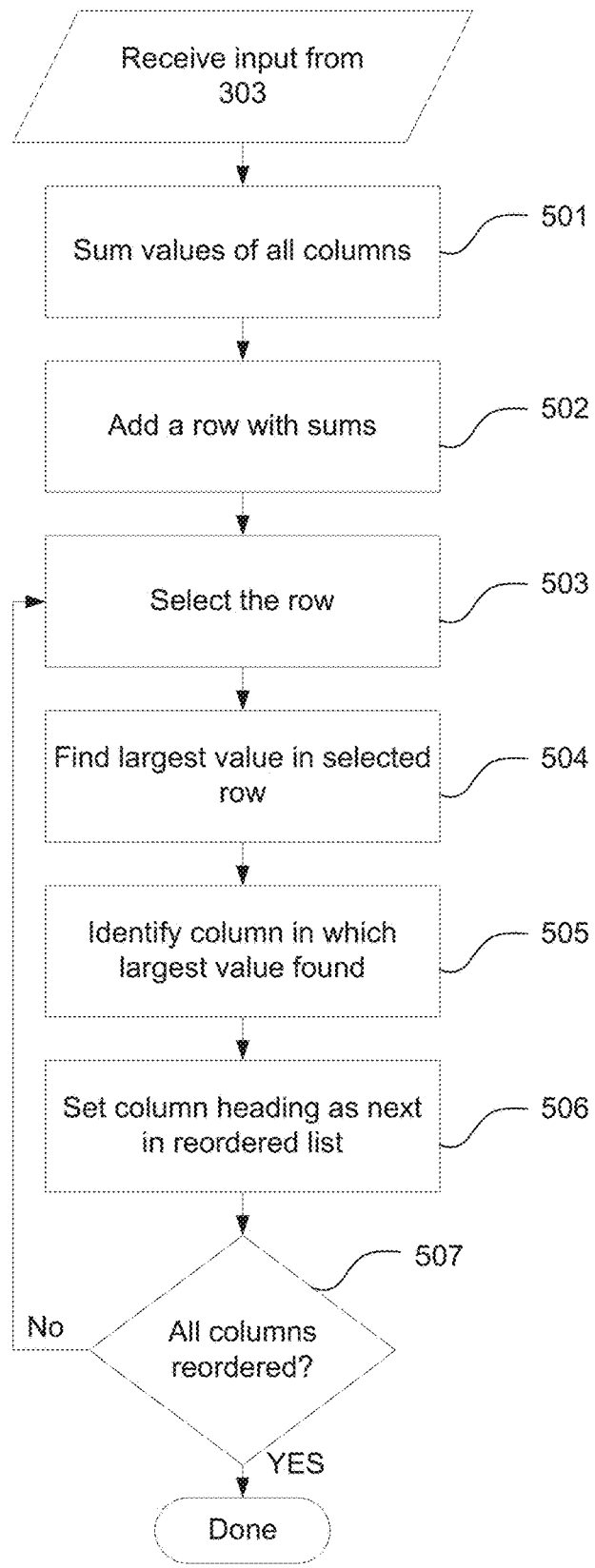
FIG. 5 is a flow diagram of the reordering process in accordance with an embodiment of the disclosure.

The reordering follows the process flow illustrated in FIG. 5. The order of precedence for the configuration attributes will start with the most connected attribute, which is determined by summing together all probabilities for each attribute, as shown at 501. At 502, a row is added to the input table (which can also be considered a matrix) with the sum values. While the row is shown as added to the bottom of the input table, it can be added in other positions as well.

At 503, the newly-added row with the sums is selected as the row for consideration. Then, at 504, the largest value is found in the row under consideration. In the example of Table 4, the largest value is 3.45. Next, at 505, the column heading of the largest value in the row under consideration is identified. In the example of Table 4, the column heading is value V (which represents _c_V) has the highest sum.

Continuing at 506, the selected column heading ("V" in this example) is selected as the next value in the reordered set. In this example, it is the first value, because the reordering process has not identified any other values yet. Thus, _c_V will be first in the re-ordered data set. This is not surprising, as it is evident from the table of FIG. 8A, the configuration data which was the original input, that _c_V is the most common attribute in the data set.

At 507, the process determines whether all of the columns have been considered. Continuing with the example of Table 4, the result would be negative, and the process continues at 503. Now, the row under consideration is the one with the heading that was just added to the reordered list. In the example of Table 4, the row under consideration will be "V." The process continues as before, looking for the greatest value in the row V at 504. Continuing with the example of Table 4, the greatest value in the row V is 0.12, which is in the F column. Thus, the next configuration value in the reordered list will be F (representing _b_F). The algorithm continues and looks in the row of the next configuration value (row F in this example) and identifies the greatest value in that row. In the present example, that value is 0.15, corresponding to column W. Thus, W is the next configuration value in the reordered list. This process repeats until all of the columns are reordered. In the example of Table 4, the reordered list of columns is: "V F W P A D J O T M Y L K G E R Q N S I H U C."

Referring again to FIG. 3, the rule learning system continues at 305, which applies non-variable window processing to the reordered data set. In embodiments, the window size is an of 2, 3, 4, 5, 6, 7, 8, 9, and 10. In an embodiment, the non-variable window processing applies the known Word2Vec algorithm, or another algorithm that detects relationships between data based on spatial distribution of the data. For example, the algorithm may consider distance between data points as a proxy for a relationship between the data points, such that data points that are closer together are considered related, while data points that are spaced farther apart are considered not related.

Embodiments of the non-variable window processing algorithm are described above, with reference to FIG. 4. An advantage of embodiments of the present disclosure is the ability to take advantage of the true attribute prediction capability of the non-variable window processing algorithm and at the same time avoiding overlooking relationships between attributes that may be spatially separated while constraining the processing. Because the attributes that appear to be related in the intermediate step are brought closer together through reordering of the data set, a non-variable length window algorithm (with an appropriately set window size) will identify relationships in the data set.

When the example of Table 4 is reordered and processed at 305, the result is shown in Table 5 below. The processing at 305 may apply scaling to suppress negligible values and emphasize the most connected values. The table below has been subjected additionally to rounding to two decimal places to more easily illustrate relationships among configuration attributes.

TABLE 5

|   | A | C | D | E | F | G | H | I | J | K | L | M |
|---|---|---|---|---|---|---|---|---|---|---|---|---|
| A | 0 | 0 | 0.53 | 0 | 0 | 0 | 0 | 0 | 0 | 0 | 0 | 0 |
| C | 0 | 0 | 0 | 0 | 0.99 | 0 | 0 | 0 | 0 | 0 | 0 | 0 |
| D | 0.68 | 0 | 0 | 0 | 0 | 0 | 0 | 0 | 0.34 | 0 | 0 | 0.31 |
| E | 0 | 0 | 0 | 0 | 0.46 | 1.06 | 0 | 0 | 0 | 0.94 | 0 | 0 |
| F | 0 | 0.20 | 0 | 0.21 | 0 | 0 | 0 | 0 | 0.21 | 0.19 | 0.42 | 0 |
| G | 0 | 0 | 0 | 0.70 | 0 | 0 | 0 | 0.32 | 0 | 0.96 | 0.70 | 0.34 |
| H | 0 | 0 | 0 | 0 | 0 | 0 | 0 | 0.49 | 0.47 | 0 | 0 | 0 |
| I | 0 | 0 | 0 | 0 | 0 | 0.50 | 0.48 | 0 | 0 | 0 | 0 | 0 |
| J | 0 | 0 | 0.35 | 0 | 0.32 | 0 | 0.35 | 0 | 0 | 0 | 0 | 0 |
| K | 0 | 0 | 0 | 0.71 | 0.32 | 1.00 | 0 | 0 | 0 | 0 | 0.68 | 0.32 |
| L | 0 | 0 | 0 | 0 | 0.99 | 1.02 | 0 | 0 | 0 | 0.97 | 0 | 0 |
| M | 0 | 0 | 0.53 | 0 | 0 | 0.49 | 0 | 0 | 0 | 0.48 | 0 | 0 |
| N | 0 | 0 | 0 | 0 | 0 | 0 | 0 | 0 | 0 | 0 | 0 | 0 |
| O | 0 | 0 | 0.34 | 0 | 0.34 | 0 | 0.34 | 0 | 1.00 | 0 | 0 | 0 |
| P | 0.93 | 0 | 0.53 | 0 | 0.47 | 0 | 0 | 0 | 0 | 0 | 0 | 0 |
| Q | 0 | 0.53 | 0.53 | 0 | 0 | 0 | 0 | 0 | 0 | 0 | 0 | 0 |
| R | 0.40 | 0.21 | 0.21 | 0.20 | 0.21 | 0.37 | 0 | 0.19 | 0.20 | 0.18 | 0 | 0 |
| S | 0.50 | 0 | 0 | 0 | 0.46 | 0 | 0.50 | 0.45 | 0 | 0 | 0 | 0 |
| T | 0.24 | 0 | 0.26 | 0 | 0 | 0 | 0.24 | 0.51 | 0.51 | 0.23 | 0 | 0.49 |
| U | 0.50 | 0 | 0.48 | 0 | 0.51 | 0 | 0.53 | 0 | 0 | 0 | 0 | 0 |
| V | 0.20 | 0.11 | 0.10 | 0.20 | 0.49 | 0.10 | 0.22 | 0.19 | 0.30 | 0 | 0.10 | 0.20 |
| W | 0.95 | 0 | 0 | 0 | 0.96 | 0 | 0 | 0 | 0 | 0 | 0 | 0 |
| Y | 0.33 | 0 | 0 | 0 | 0.32 | 0 | 0 | 0 | 0 | 0.31 | 0.29 | 0.28 |

|   | N | O | P | Q | R | S | T | U | V | W | Y |
|---|---|---|---|---|---|---|---|---|---|---|---|
| A | 0 | 0 | 0.99 | 0 | 0.47 | 0.25 | 0.24 | 0.26 | 0.48 | 0.52 | 0.25 |
| C | 0 | 0 | 0 | 0.94 | 0.99 | 0 | 0 | 0 | 1.06 | 0 | 0 |
| D | 0 | 0.35 | 0.66 | 0.34 | 0.34 | 0 | 0.30 | 0.32 | 0.34 | 0 | 0 |
| E | 0 | 0 | 0 | 0 | 0.47 | 0 | 0 | 0 | 1.05 | 0 | 0 |
| F | 0 | 0.20 | 0.39 | 0 | 0.20 | 0.20 | 0 | 0.20 | 0.97 | 0.42 | 0.20 |
| G | 0 | 0 | 0 | 0 | 0.65 | 0 | 0 | 0 | 0.32 | 0 | 0 |
| H | 0 | 0.51 | 0 | 0 | 0 | 0.49 | 0.50 | 0.47 | 1.05 | 0 | 0 |
| I | 0 | 0 | 0 | 0 | 0.48 | 0.52 | 1.01 | 0 | 0.99 | 0 | 0 |
| J | 0 | 1.02 | 0 | 0 | 0.32 | 0 | 0.67 | 0 | 0.96 | 0 | 0 |
| K | 0 | 0 | 0 | 0 | 0.33 | 0 | 0.31 | 0 | 0 | 0 | 0.32 |
| L | 0 | 0 | 0 | 0 | 0 | 0 | 0 | 0 | 0.50 | 0 | 0.51 |
| M | 0 | 0 | 0 | 0 | 0 | 0 | 0.97 | 0 | 1.05 | 0 | 0.47 |
| N | 0 | 0 | 1.04 | 0.94 | 0.93 | 0 | 0 | 0 | 1.08 | 0 | 0 |
| O | 0 | 0 | 0 | 0.30 | 0.34 | 0.35 | 0.67 | 0 | 0.33 | 0 | 0 |
| P | 0.27 | 0 | 0 | 0 | 0.25 | 0 | 0 | 0 | 0.49 | 0.54 | 0.51 |
| Q | 0.51 | 0.51 | 0 | 0 | 0.96 | 0 | 0 | 0 | 0.95 | 0 | 0 |
| R | 0.22 | 0.20 | 0.20 | 0.40 | 0 | 0.20 | 0 | 0 | 0.60 | 0 | 0 |
| S | 0 | 0.51 | 0 | 0 | 0.52 | 0 | 0.51 | 0 | 0.54 | 0 | 0 |
| T | 0 | 0.51 | 0 | 0 | 0 | 0.27 | 0 | 0.25 | 0.24 | 0 | 0.23 |
| U | 0 | 0 | 0 | 0 | 0 | 0 | 0.48 | 0 | 1.00 | 0 | 0.49 |
| V | 0.10 | 0.10 | 0.20 | 0.20 | 0.31 | 0.11 | 0.10 | 0.19 | 0 | 0.20 | 0.28 |

TABLE 5-continued

| | | | | | | | | | | | |
|---|---|---|---|---|---|---|---|---|---|---|---|
| W | 0 | 0 | 1.04 | 0 | 0 | 0 | 0 | 0 | 1.04 | 0 | 0 |
| Y | 0 | 0 | 0.68 | 0 | 0 | 0 | 0.34 | 0.37 | 1.06 | 0 | 0 |

At 306, the rule learning system analyzes the results to generate, update, or delete rules. In the example of Table 5, a relationship between _a_A and _g_P is seen in row A, where the value for column P is 0.99. This is confirmed by inspecting the table of FIG. 8A, where every instance of a configuration that has attribute _a set to A also has the attribute _g set to P. The same holds true for the relationship between O and J; and the relationship between G and K. Beyond these simple relationships, the output in Table 5 identifies many hidden relationships that can be used to generate rules. In an embodiment, a new rule is generated for any cell in the table that is above a predetermined threshold value. In an embodiment, the threshold value represents 50% likelihood of attributes being related. In the example of Table 5, that value would be 0.5 due to the scaling applied by the processing. Each new rule may have the logic of "If attribute1=value1, then attribute2=value2." For example, considering row "D" in table 5, two new rules would be "If _b_D then _a_A" and "If _b_D then _g_P." It should be appreciated that multiple attributes can be linked by rules. For example, the data in Table 5 also support rules such as "If _a_A, then _b_D, _g_P, _f_W." Similarly, rules linking multiple input attributes to one or more output attributes can be derived, such as "If _a_A and _b_D, then _g_P, _f_W."

The threshold value may be selected such that a predetermined number of new rules is generated. The rule learning system may be configured to generate X new rules, and the predetermined threshold is then set so that X values in the result table exceed the predetermined threshold. This will yield X new rules.

Referring to FIG. 7, a representation of a neural network implementation of the flow in FIG. 3 is illustrated. The input vector 40 is the preprocessed dataset from step 302 in FIG. 3. The network 44 can have a number of layers and various types of layers. In an embodiment, the network 44 includes a broad network of 300 neurons 451 and 461 per layer and only 2 layers. The first layer 45 performs most of the learning, while the second layer 46 condenses the learned attributes to the correct dimensions of the output vector.

In embodiments, the inputs are fed into a generic neural network for learning and this network can have whatever topology is required for the learning task. The nodes 451 and 461 in the network are linear transformation nodes. In an embodiment, each neuron will have a weight for each input dimension and the aggregate weights defined in all neurons to determine the significance of the relationship between attributes.

As disclosed, a product configurator enables users to select configurations of complex products based on rules. The product configurator includes a rule learning system that creates new rules and modifies and deletes existing rules based on analyzing past configurations of the complex products. Because the products being configured may have many configurable attributes, a human administrator is unable to analyze the past configurations to identify patterns and use those patterns to create rules. The rule learning system as disclosed applies specific machine learning algorithms that detect patterns in the configuration data and creates configuration rules from those patterns, making the product configurator function faster and more efficiently than if the configuration rules were created by the human administrator.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A product configuration device that outputs a configuration of a product in accordance with a set of configuration rules, the device comprising:
    a rule learning system configured to:
        acquire a first set of data representing a plurality of different configurations of the product, each different configuration of the product comprising a different valid combination of selectable configuration attributes;
        generate a neural network model representing the first set of data;
        extract relationships between the configuration attributes using the neural network model, the relationships comprising one or more combinations of configuration attributes of previously generated configurations of the product, the extracting comprising:
            first processing, using variable window processing to determine which configuration attributes are more closely linked to each other, the variable window processing comprising, for a given attribute, varying a window size away from the give attribute for each iteration of multiple iterations so that each iteration is sampling a different set of attributes to generate a variable window output;
            based on the first processing, reordering the variable window output to generate an intermediate output based on a level of connections of each configuration attribute;
            second processing, using fixed window processing, the intermediate output to generate a strength of relationships between the configuration attributes;
        modify the set of configuration rules based on the extracted relationships to generate a modified set of configuration rules for the product configuration device, wherein the set of configuration rules specify valid combinations and invalid combinations of configuration attributes for the product; and
    a rule execution engine that outputs the configuration of the product based on the modified set of configuration rules.

2. The product configuration device according to claim 1, wherein the previously generated configurations of the product are generated by users of product configuration devices and output by the product configuration devices using the set of configuration rules and the relationships indicate desirable combination of attributes by the users.

3. The product configuration device according to claim 1, wherein
    the intermediate output includes configuration attributes spatially arranged with most connected attributes being at one end of the intermediate output and least connected attributes being at an opposite end of the intermediate output.

4. The product configuration device according to claim 1, wherein
the rule learning system is further configured to generate a relationship matrix representing the strength of relationships between the configuration attributes.

5. The product configuration device according to claim 4, wherein
the rule learning system is further configured to generate a new configuration rule for a relationship between configuration attributes having a strength above a threshold value.

6. The product configuration device according to claim 5, wherein
the threshold value is selected to generate a predetermined number of configuration rules.

7. The product configuration device according to claim 1, wherein
the neural network model includes a first and a second layer of neurons,
the first layer of neurons performs learning of configuration attribute relationships, and
the second layer of neuron condenses the learned attributes into an output vector of predefined dimensions.

8. A method of generating configuration rules for configuring a product, the method comprising:
acquiring a first set of data representing a plurality of different configurations of the product, each different configuration of the product comprising a different valid combination of selectable configuration attributes;
generating a neural network model representing the first set of data;
extracting relationships between the configuration attributes using the neural network model, the relationships comprising one or more combinations of configuration attributes of previously generated configurations of the product, the extracting comprising:
first processing, variable window processing to determine which configuration attributes are more closely linked to each other, the variable window processing comprising, for a given attribute, varying a window size sway from the given attribute for each iteration of multiple iterations so that each iteration is sampling a different set of attributes to generate a variable window output;
based on the first processing, reordering the variable window output to generate an intermediate output based on a level of connections of each configuration attribute;
second processing, using fixed window processing, the intermediate output to generate a strength of relationships between the configuration attributes;
modifying a set of configuration rules based on the extracted relationships to generate a modified set of configuration rules for the configuring of the product, wherein the set of configuration rules specify valid combinations and invalid combinations of configuration attributes for the product; and
outputting the configuration of the product based on the modified set of configuration rules.

9. The method according to claim 8, wherein the previously generated configurations of the product are generated by users of product configuration devices and output by the product configuration devices using the set of configuration rules and the relationships indicate desirable combination of attributes by the users.

10. The method according to claim 8, wherein
the intermediate output includes configuration attributes spatially arranged with most connected attributes being at one end of the intermediate output and least connected attributes being at an opposite end of the intermediate output.

11. The method according to claim 8, further comprising:
generating a relationship matrix representing the strength of relationships between the configuration attributes.

12. The method according to claim 11, wherein
said modifying the set of configuration rules is based on a relationship between configuration attributes having a strength above a threshold value.

13. The method according to claim 12, wherein
the threshold value is selected to generate a predetermined number of configuration rules.

14. The method according to claim 13, wherein
the neural network model includes a first and a second layer of neurons,
the first layer of neurons performs learning of configuration attribute relationships, and
the second layer of neuron condenses the learned attributes into an output vector of predefined dimensions.

15. A non-transitory computer-readable medium having instructions stored thereon that, when executed by a processor, cause the processor to generate configuration rules for configuring a product, the generating the configuration rules comprising:
acquiring a first set of data representing a plurality of different configurations of the product, each different configuration of the product comprising a different combination of selectable configuration attributes;
generating a neural network model representing the first set of data;
extracting relationships between the configuration attributes using the neural network model, the relationships comprising one or more combinations of configuration attributes of previously generated configurations of the product, the extracting comprising:
first processing, using variable window processing to determine which configuration attributes are more closely linked to each other, the variable window processing comprising, for a given attribute, varying a window size away from the given attribute for each iteration of multiple iterations so that each iteration is sampling a different set of attributes to generate a variable window output;
based on the first processing, reordering the variable window output to generate an intermediate output based on a level of connections of each configuration attribute;
second processing, using fixed window processing, the intermediate output to generate a strength of relationships between the configuration attributes;
modifying a set of configuration rules based on the extracted relationships to generate a modified set of configuration rules for the configuring of the product, wherein the set of configuration rules specify valid combinations and invalid combinations of configuration attributes for the product; and
outputting the configuration of the product based on the modified set of configuration rules.

16. The non-transitory computer-readable medium according to claim 15,
wherein the previously generated configurations of the product are generated by users of product configuration devices and output by the product configuration devices using the set of configuration rules and the relationships indicate desirable combination of attributes by the users.

17. The non-transitory computer-readable medium according to claim 15, wherein the intermediate output includes configuration attributes are spatially arranged with most connected attributes being at one end of the intermediate output and least connected attributes being at an opposite end of the intermediate output.

18. The non-transitory computer-readable medium according to claim 15, wherein
the rule learning system is further configured to generate a new configuration rule for a relationship between configuration attributes having a strength above a threshold value.

19. The non-transitory computer-readable medium according to claim 18, wherein
the threshold value is selected to generate a predetermined number of configuration rules.

20. The non-transitory computer-readable medium according to claim 15, wherein
the neural network model includes a first and a second layer of neurons,
the first layer of neurons performs learning of configuration attribute relationships, and
the second layer of neuron condenses the learned attributes into an output vector of predefined dimensions.

* * * * *

UNITED STATES PATENT AND TRADEMARK OFFICE
CERTIFICATE OF CORRECTION

PATENT NO. : 11,822,860 B2
APPLICATION NO. : 15/923373
DATED : November 21, 2023
INVENTOR(S) : Wilkins et al.

Page 1 of 1

It is certified that error appears in the above-identified patent and that said Letters Patent is hereby corrected as shown below:

In the Specification

In Column 2, Line 34, delete "invention" and insert -- invention. --, therefor.

In Column 11, Line 43, delete "the of this" and insert -- the --, therefor.

In the Claims

In Column 18, Line 38, in Claim 1, delete "give" and insert -- given --, therefor.

In Column 19, Line 42, in Claim 8, after "processing," insert -- using --, therefor.

In Column 19, Line 46, in Claim 8, delete "sway" and insert -- away --, therefor.

Signed and Sealed this
Eleventh Day of June, 2024

Katherine Kelly Vidal
*Director of the United States Patent and Trademark Office*